Oct. 7, 1958

A. CHOLGER 2,854,741

HOLDING TOOL

Filed Aug. 9, 1954

*INVENTOR.*
ALVIN CHOLGER
BY Whittemore,
Hulbert & Belknap
ATTORNEYS

United States Patent Office 2,854,741
Patented Oct. 7, 1958

2,854,741

HOLDING TOOL

Alvin Cholger, Tawas City, Mich.

Application August 9, 1954, Serial No. 448,635

2 Claims. (Cl. 29—271)

The present invention relates to a holding tool and more particularly to a quickly releasable tool adapted to be used to support a bottom cover or the like in position while a plurality of fastening screws or bolts are inserted to support the weight of the cover.

It is an object of the present invention to provide a tool of the character described characterized by its simplicity and efficiency in operation, the economy with which it may be produced, and the rapidity with which it may be applied and removed in operation.

More specifically, it is an object of the present invention to provide a tool of the character described comprising a headless screw, and abutment means slidably associated with the screw and adapted to be inserted over the shank of the screw and to wedgingly engage the screw.

It is a further object of the present invention to provide a tool as described in the preceding paragraph including manually releasable means for controlling wedging engagement between the abutment and the screw.

Other objects and features of the invention will become apparent as the description proceeds, especially when taken in conjunction with the accompanying drawings, wherein.

Figure 1:
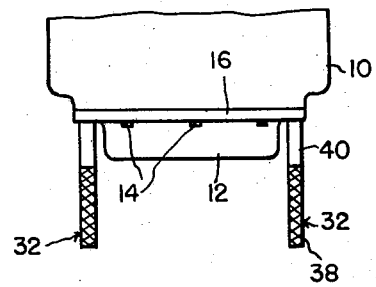
Figure 1 is a fragmentary view illustrating the intended use of the tool.

Referring first to Figure 1 there is illustrated a portion of a housing 10 which may be a differential carrier housing, a hydromatic housing, or the like, adapted to have a bottom pan or closure 12 secured thereto by means of a plurality of bolts or screws some of which are indicated at 14 which extend through openings in the attaching flange 16 of the pan or closure 12.

One of the troublesome problems in replacing a pan or cover to structure of this type is the necessity of supporting the weight of the pan or cover while it is maintained in proper registration with the tapped or threaded holes normally provided in the housing 10. The problem is rendered more difficult by the usual necessity of providing for a sealing gasket to be maintained in proper registration with the bolt receiving holes until the structure is completely assembled.

In accordance with the present invention means which may be quickly applied and quickly removed are provided for supporting the pan or cover 12 in properly located position while sufficient of the screws or bolts 14 are applied to hold the structure in assembly.

Figure 2:
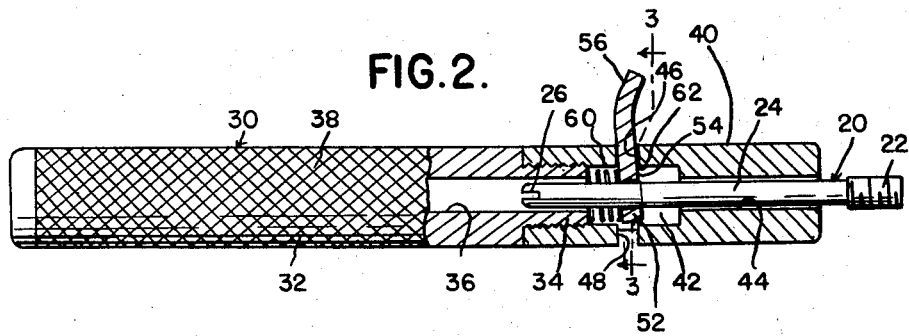
Figure 2 is a side elevation partly in section showing the operating elements of the tool.
Figure 3:
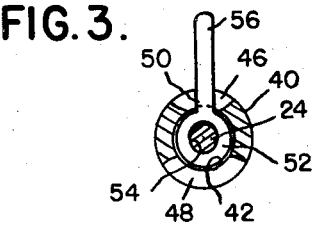
Figure 3 is a sectional view on the line 3—3, Figure 2.

Referring now particularly to Figures 2 and 3, the present invention comprises headless screws 20 having threaded portions 22 adapted to be threaded into the tapped or threaded recesses normally provided in the housing 10. The screws 20 are provided with elongated shanks 24 of uniform cross-section and preferably at the end of the shank opposite to the threaded end the screws are provided with driving means 26 herein illustrated as a screwdriver slot.

The screws 20 may be attached to the housing 10 prior to elevating the pan or cover 12 into position and after assembly the shank portions 24 of the screws extend downwardly and are adapted to serve as guide means for locating the pan or cover 12 in proper registration with the threaded holes as it is raised into position.

Associated with the screws 20 are abutment devices indicated generally at 30, each of which comprises a handle portion 32 and a nozzle 40. The handle portions 32 are provided at the forward end thereof with a reduced externally threaded forwardly extending portion 34, the entire handle being provided with an opening 36 extending therethrough. Preferably, the handle is knurled as indicated generally at 38. The nozzle 40 includes a relatively large chamber portion 42 threaded at one end to receive the threaded extension 34 of the handle. Extending into the chamber 42 from one end of the nozzle 40 is a cylindrical opening 44 shaped to receive the shank of the screw 22. Extending into the chamber 42 from opposite sides thereof are a relatively small lateral opening 46 and a relatively larger lateral opening 48.

A wedge lock member 50 is provided having a generally cylindrical enlarged head 52 provided with a circular opening 54 and including a laterally extending release finger or lever portion 56. The lateral opening 48 extending into the chamber 42 is of a size to permit the head portion 52 of the wedge lock to pass therethrough into the chamber. As will be apparent, the wedge lock is assembled by inserting the lever portion 56 into the opening 48 and through the chamber 42 and out the opening 46 while moving the enlarged head portion 52 into the chamber.

Located in the chamber and extending between the end of the extension 34 of the handle and the enlarged head portion 52 of the wedge lock is a coil compression spring 60. As will be apparent from Figure 2, the spring 60 is effective to urge the head portion 52 of the wedge lock to the right and out of alignment with the opening 48 so as to prevent accidental removal of wedge lock from the assembly.

From the foregoing description it is believed that the operation of the device will be readily apparent. After the screws 20 are inserted in a pair of widely separated threaded holes in the housing, the pan or closure 12 is moved up into position against the underside of the housing, this movement being effectively guided by engagement with the shanks 24 of the screws. With the pan or closure 12 in proper position, the abutment devices are slid upwardly over the shanks of the screws until the ends of the nozzles engage the underside of the flange 16 on the pan or closure. The openings 54 through the enlarged head portions 52 of the abutment wedges are of a diameter somewhat greater than the diameter of the shank portion 24 of the screws so that under the action of the compression springs 60 the wedge locks are swung in counterclockwise direction as illustrated in Figure 2 to a wedging position, this movement taking place about a fulcrum provided by a corner of the opening 46, this fulcrum being indicated by the reference numeral 62. When the handle 30 is released, the weight of the pan or closure acts on the upper end of the nozzle 40 and more specifically, is effective at the fulcrum 62 to apply the supported weight to the wedge lock and thence to the shank 24 of the screw. Accordingly, the abutment device retains the pan or closure in assembled position without the possiblity of any appreciable downward movement when the abutment device or the handle thereof is removed.

At this time a sufficient number of assembly bolts 14 are provided to retain the pan or closure 12 in properly assembled position, after which the abutment devices may be withdrawn from the screws 20 by simply pressing upwardly on the lever portions 56 of the wedge locks. This releases the wedging action between the wedge locks and the screws and permits the abutment devices to be withdrawn freely from the downwardly depending screws. Thereafter of course, the screws are readily removed with a screwdriver and are replaced by the conventional assembly bolts 14.

The present invention greatly facilitates the assembly of relatively heavy and awkwaard pans or bottom closures on housing structures and permits the same to be applied readily and efficiently by a single operator without the possibility of lack of registration between sealing gaskets or other difficulties.

The drawings and the foregoing specification constitute a description of the improved holding tool in such full, clear, concise and exact terms as to enable any person skilled in the art to practice the invention, the scope of which is indicated by the appended claims.

What I claim as my invention is:

1. A device for temporarily securing an object in place upon a support while its permanent fasteners are being applied, comprising a headless screw having a threaded portion adapted to be removably secured in a threaded opening in the support and having a shank extending from said threaded portion and adapted to extend through an opening in the object aligned with the threaded opening in the support, an abutment member having an enlarged chamber therein and having a lateral opening communicating with said chamber, said abutment member also having a second opening communicating with said chamber and adapted to slidably receive the shank of said screw, a locking member comprising a part in said chamber having an aperture therein for freely receiving said shank, said locking member including a release lever projecting from said part through said lateral opening, means urging said part into locking engagement with said shank to prevent withdrawal of said shank from the second opening in said abutment member, said locking member being movable to release position against the action of said means by manual operation of said release lever, thereby to permit withdrawal of said shank from the second opening in said abutment member, said abutment member having a third opening into said chamber directly opposite said lateral opening through which said locking member is insertable to locate said apertured part within said chamber and said release lever projecting through said lateral opening, said apertured part of said locking member in said chamber being urged by said means into a position out of alignment with said third opening.

2. A device for temporarily securing an object in place upon a support while its permanent fasteners are being applied, comprising a headless screw having a threaded portion adapted to be removably secured in a threaded opening in the support and having a shank of uniform cross-section extending from said threaded portion and adapted to extend through an opening in the object aligned with the threaded opening in the support, an abutment member having an enlarged chamber therein and having a lateral opening communicating with said chamber, said abutment member also having a second opening communicating with said chamber and adapted to slidably receive the shank of said screw, a wedge lock comprising a part in said chamber having an aperture therein for slidably receiving said shank, said wedge lock including a release lever projecting from said part through said lateral opening, means on said abutment member engageable with said wedge lock at a point offset from the aperture in said part to provide a fulcrum pivot for said wedge lock, and a spring in said chamber bearing against said part and urging the latter in one direction about said fulcrum pivot into wedging engagement with said shank to prevent withdrawal of said shank from the second opening in said abutment member, said wedge lock being movable to release position in the opposite direction about said fulcrum pivot against the action of said spring by manual operation of said release lever, thereby to permit withdrawal of said shank from the second opening in said abutment member, said abutment member having a third opening into said chamber directly opposite said lateral opening through which said wedge lock is insertable to locate said apertured part within said chamber and said release lever projecting through said lateral opening, said apertured part of said wedge lock being movable in said chamber under the action of said spring into a position out of alignment with said third opening.

References Cited in the file of this patent

UNITED STATES PATENTS

| | | |
|---|---|---|
| 836,303 | Christensen | Nov. 20, 1906 |
| 1,921,379 | Bailey | Aug. 8, 1933 |
| 2,121,937 | Tichota et al. | June 28, 1938 |
| 2,670,174 | Lucker | Feb. 23, 1954 |